US009184824B1

(12) United States Patent
Wu

(10) Patent No.: US 9,184,824 B1
(45) Date of Patent: Nov. 10, 2015

(54) INTRA-PACKET ANTENNA DIVERSITY SYSTEMS AND METHODS

(71) Applicant: Marvell International Ltd., Hamilton (BM)

(72) Inventor: Songping Wu, Cupertino, CA (US)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 13/723,476

(22) Filed: Dec. 21, 2012

Related U.S. Application Data

(60) Provisional application No. 61/585,203, filed on Jan. 10, 2012.

(51) Int. Cl.
*H04B 7/08* (2006.01)
*H04B 7/06* (2006.01)
*H04L 27/34* (2006.01)

(52) U.S. Cl.
CPC .............. *H04B 7/0814* (2013.01); *H04B 7/061* (2013.01); *H04L 27/34* (2013.01)

(58) Field of Classification Search
CPC .... H04B 7/0691; H04B 7/082; H04B 7/0689; H04B 17/318; H04B 7/061; H04B 7/0452; H04B 7/084; H04B 7/0842; H04L 1/0041; H04L 1/06; H04L 27/2627
See application file for complete search history.

(56) References Cited

U.S. PATENT DOCUMENTS

| 4,404,563 | A * | 9/1983 | Richardson | 342/368 |
| 5,107,267 | A * | 4/1992 | Janusas et al. | 342/15 |
| 5,657,026 | A * | 8/1997 | Culpepper et al. | 342/374 |
| 6,434,374 | B1 * | 8/2002 | Muterspaugh | 455/234.1 |
| 7,324,794 | B2 * | 1/2008 | Chari et al. | 455/130 |
| 2003/0103581 | A1 * | 6/2003 | Rawlins et al. | 375/319 |
| 2006/0073802 | A1 * | 4/2006 | Chari et al. | 455/276.1 |
| 2007/0071149 | A1 * | 3/2007 | Li et al. | 375/347 |
| 2010/0151898 | A1 * | 6/2010 | Lee et al. | 455/522 |
| 2012/0115428 | A1 * | 5/2012 | Rudberg | 455/226.2 |

OTHER PUBLICATIONS

IEEE Recommended Practice for Information technology—Telecommunications and information exchange between systems—Local and metropolitan area networks—Specific requirements; IEEE Std 802.15.2-2003, Part 15.2: Coexistence of Wireless Personal Area Networks with Other Wireless Devices Operating in Unlicensed Frequency Bands, Aug. 28, 2003, p. 1-126.
IEEE Standard for Local and Metropolitan Area Networks, IEEE Std 802.16/2009 (Revision of IEEE Std 802.16/2004), Part 16: Air Interface for Broadband Wireless Access Systems, IEEE Computer Society and the IEEE Microwave Theory and Techniques Society, May 29, 2009, p. 1-2082.
International Standard ISO/IEC 8802-11, ANSI/IEEE Std 802.11 First edition 1999-00-00, Information technology—Telecommunications and information exchange between systems—Local and metropolitan area networks—Specific requirements; Part 11: Wireless LAN Medium Access COntrol (MAC) and Physical Layer (PHY) specifications, 1999 edition, p. 1-531.

* cited by examiner

*Primary Examiner* — Chieh M Fan
*Assistant Examiner* — Sarah Hassan

(57) ABSTRACT

A first amplifier is configured to provide a first variable gain. A selecting module is configured to (i) connect a first antenna to the first amplifier when a selection signal is in a first state, and (ii) connect a second antenna to the first amplifier when the selection signal is in a second state. A second amplifier is in communication with an output of the first amplifier and is configured to provide a second variable gain. An automatic gain control (AGC) module is configured to control each of the first and second variable gains. An antenna selection module is configured to selectively change the selection signal in response to the first variable gain or the second variable gain after a preamble of a data packet and before a payload of the data packet.

20 Claims, 3 Drawing Sheets

INTRA-PACKET ANTENNA DIVERSITY SYSTEMS AND METHODS

CROSS-REFERENCE TO RELATED APPLICATIONS

The present disclosure claims the benefit of U.S. Provisional Application No. 61/585,203, filed on Jan. 10, 2012. The application referenced above is incorporated herein by reference in its entirety.

FIELD

The present disclosure relates to wireless communication systems and more particularly to intra-packet antenna diversity systems and methods for wireless receivers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various standards have been developed for implementing wireless networks, such as I.E.E.E. 802.11, I.E.E.E. 802.15, and I.E.E.E. 802.16, which are incorporated herein by reference in their entirety. Other standards for implementing wireless networks have also been developed. Generally speaking, a first wireless networking device packetizes blocks of data that are to be transferred and wirelessly transmits the data. A second wireless networking device wirelessly receives the data.

A data packet includes a header and a payload. The header of the data packet precedes the payload and includes a preamble. The header includes control data that enables a receiving device to correctly process the data packet. The payload of the data packet includes a block of user data that is being communicated.

SUMMARY

A device for wirelessly receiving a data packet includes a first amplifier, a second amplifier, a selecting module, an automatic gain control (AGC) module, and an antenna selection module. The first amplifier is configured to provide a first variable gain. The selecting module is configured to (i) connect a first antenna to the first amplifier when a selection signal is in a first state, and (ii) connect a second antenna to the first amplifier when the selection signal is in a second state. The second amplifier is in communication with an output of the first amplifier and is configured to provide a second variable gain. The AGC module is configured to control each of the first variable gain and the second variable gain. The antenna selection module is configured to selectively change the selection signal in response to the first variable gain or the second variable gain after a preamble of the data packet and before a payload of the data packet.

A method for wirelessly receiving a data packet includes connecting a first antenna to a first amplifier when a selection signal is in a first state. The first amplifier is configured to provide a first variable gain. The method further includes connecting a second antenna to a second amplifier when the selection signal is in a second state. The second amplifier is in communication with an output of the first amplifier and is configured to provide a second variable gain. The method further includes: controlling each of the first variable gain and the second variable gain; and selectively changing the selection signal in response to the first variable gain or the second variable gain after a preamble of the data packet and before a payload of the data packet.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Some wireless devices may include multiple antennas for receiving data wirelessly. Schemes for switching from one antenna to another antenna have been developed, including per-packet antenna diversity and multiple packet antenna diversity. Antenna diversity refers to selecting different antennas to receive data, for example, to improve quality and/or reliability of wireless data reception.

Per-packet antenna diversity involves selectively switching antennas based on characteristics of a prior data packet, such as the header of the previous data packet and a cyclical redundancy check (CRC) field. Multiple-packet antenna diversity involves selectively switching antennas based on statistical information determined based on two or more prior data packets.

Intra-packet antenna diversity is another type of antenna diversity. Intra-packet antenna diversity involves selectively switching antennas during reception of a data packet before the payload of the data packet is received. For example, one type of intra-packet antenna diversity involves selectively switching antennas based on a received signal strength indicator (RSSI) generated based on a portion of the data packet that precedes the payload and/or correlation of the portion of the data packet with a predetermined pattern.

The present disclosure relates to intra-packet antenna diversity systems and methods for selectively switching antennas based on gains of a variable gain low noise amplifier (LNA) and another variable gain amplifier (VGA) during a predetermined period before the payload of a data packet. A determination as to whether to switch antennas based on the gains of the LNA and the VGA may be made sooner than if signal matching is used. Determining whether to switch antennas based on the gains of the LNA and the VGA tends to be more reliable than use of RSSI.

Figure 1:
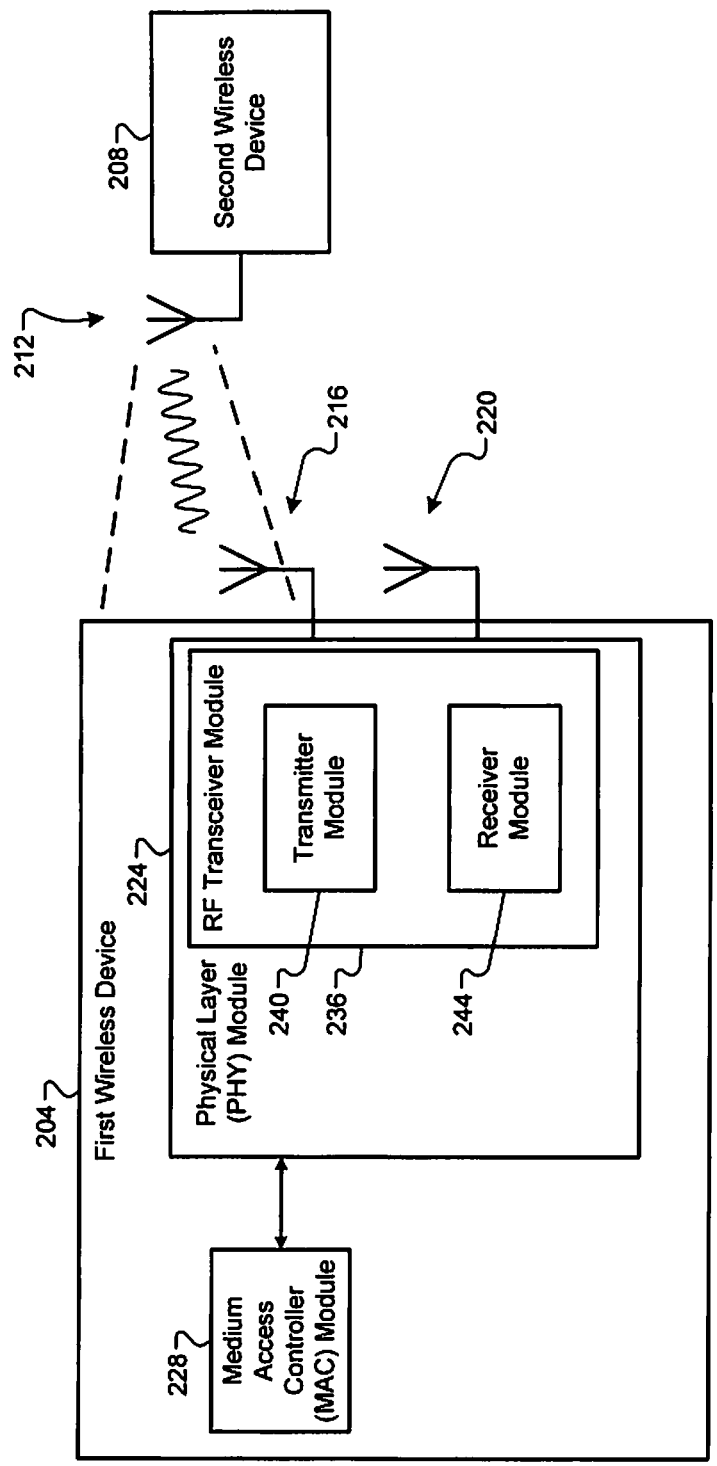
FIG. 1 is a functional block diagram of an example of a wireless network system according to one implementation of the present disclosure.

FIG. 1 shows an example wireless network system including a first wireless device 204 and a second wireless device 208. The second wireless device 208 includes at least one antenna, such as antenna 212. The second wireless device 208 packetizes data and wirelessly outputs data using the at least one antenna.

The first wireless device 204 includes first and second antennas 216 and 220. While the first wireless device 204 is shown and will be discussed as including only the first and second antennas 216 and 220, the first wireless device 204 may include more than two antennas. The first wireless device 204 also includes a physical layer (PHY) module 224 and a medium access controller (MAC) module 228.

The PHY module 224 communicates wirelessly using the first and second antennas 216 and 220. The PHY module 224 may include a radio frequency (RF) transceiver module 236 that wirelessly transmits and receives data. The MAC module 228 may communicate with the PHY module 224. The RF transceiver module 236 includes a transmitter module 240 that wirelessly transmits data. The RF transceiver module 236 also includes a receiver module 244 that wirelessly receives data using the first and second antennas 216 and 220.

Under some circumstances, data received by the first antenna 216 may have a higher or lower signal to noise ratio than data received by the second antenna 220 or vice versa. For example only, this may occur when one or both of the first wireless device 204 and the second wireless device 208 is mobile.

Figure 2:
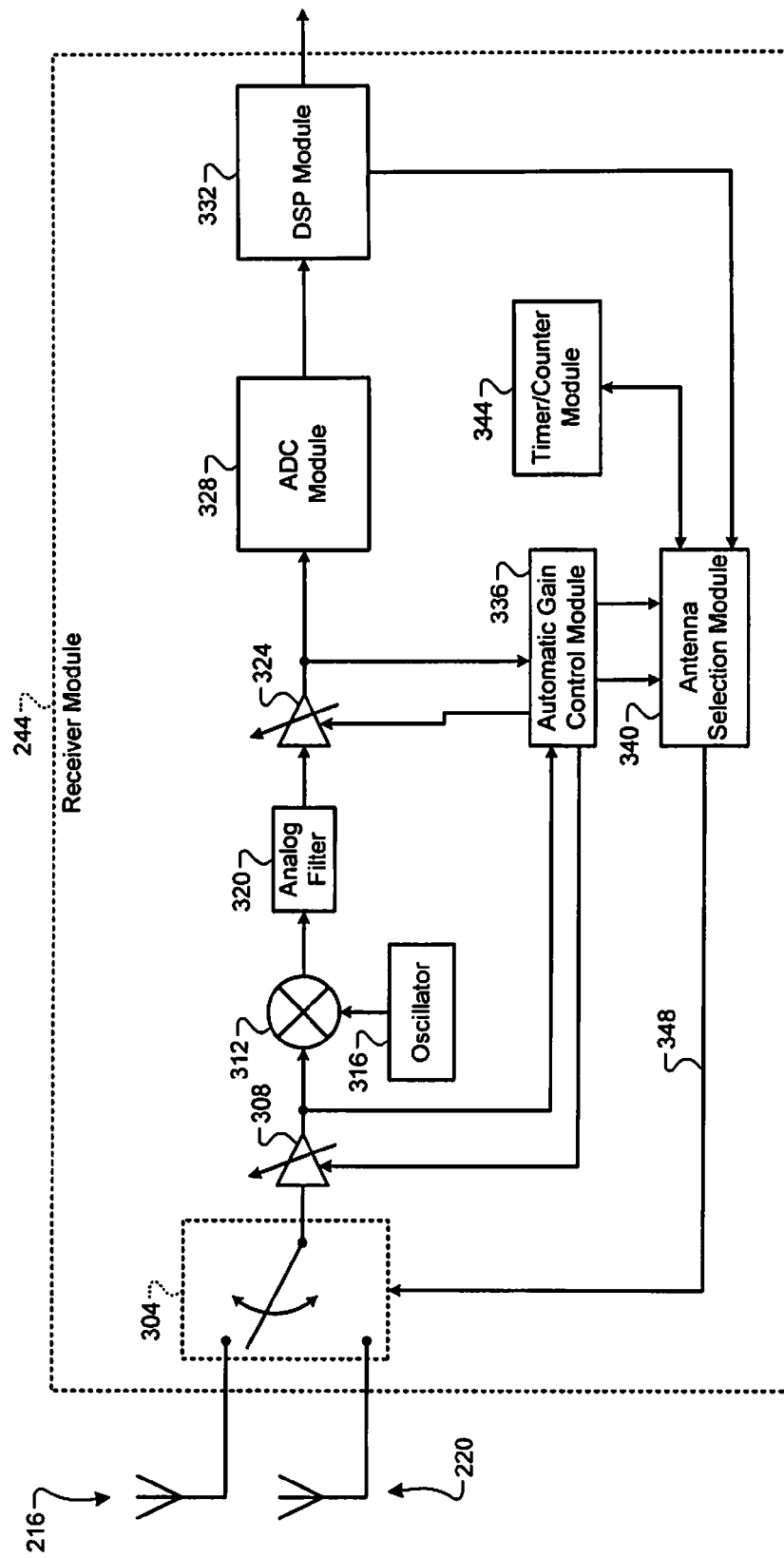
FIG. 2 is a functional block diagram of an example of a receiver module that is connected to at least two antennas according to one implementation of the present disclosure.

FIG. 2 shows a functional block diagram of an example implementation of the receiver module 244. The receiver module 244 includes a selecting module 304, a variable gain low noise amplifier (LNA) 308, a mixer 312, a local oscillator 316, an analog filter 320, and a variable gain amplifier (VGA) 324. The receiver module 244 also includes an analog to digital converter (ADC) module 328, a digital signal processing (DSP) module 332, an automatic gain control (AGC) module 336, an antenna selection module 340, and a timer/counter module 344.

The first and second antennas 216 and 220 generate signals based on data received wirelessly. The selecting module 304 connects one of the first antenna 216 and the second antenna 220 to an input of the LNA 308 based on a selection signal 348. For example only, the selecting module 304 may connect the first antenna 216 to the LNA 308 when the selection signal 348 is in a first state and connect the second antenna 220 to the LNA 308 when the selection signal 348 is in a second state, or vice versa. Signals from the connected one of the first and second antennas 216 and 220 are therefore input to the LNA 308.

The LNA 308 amplifies the input signals. While the LNA 308 is shown as a single VGA, the LNA 308 includes at least one VGA and may include one or more other amplifiers. The mixer 312 mixes the signals output by the LNA 308 with signals from the local oscillator 316 to convert the signals to baseband. The analog filter 320 filters the baseband signals output by the mixer 312. For example only, the analog filter 320 may include a band pass filter and/or one or more other suitable analog filters.

The VGA 324 amplifies the signals output by the analog filter 320. While only the VGA 324 is shown, one or more additional amplifiers may be provided. The ADC module 328 converts the (analog) signals from the VGA 324 into digital signals. The DSP module 332 may perform one or more signal processing functions on the digital signals and output processed signals, for example, to the MAC module 228.

The DSP module 332 may also determine a quality of the received signals, such as a received signal strength indicator (RSSI). For example only, the DSP module 332 may determine the RSSI based on a correlation of a portion of the received signal with a predetermined pattern, a code error rate, and/or one or more other suitable characteristics of the received signal.

The AGC module 336 automatically controls the gains of LNA 308 and the VGA 324. For example, the AGC module 336 controls the gain of the LNA 308 based on the output of the LNA 308, and the AGC module 336 controls the gain of the VGA 324 based on the output of the VGA 324.

The AGC module 336 also communicates the gain of the LNA 308 and the gain of the VGA 324 to the antenna selection module 340. In implementations where the WA 308 and/or the VGA 324 include more than one amplifier, the AGC module 336 may communicate the total gain of the LNA 308 and the other amplifier(s) and the total gain of the VGA 324 and the other amplifier(s) to the antenna selection module 340.

The antenna selection module 340 controls the selecting module 304 via the selection signal 348. The antenna selection module 340 controls the selecting module 304 based on the gain of the LNA 308 and the gain of the VGA 324. The antenna selection module 340 also controls the selecting module 304 based on the quality of the signals received by the connected one of the first and second antennas 216 and 220, as discussed further below.

The timer/counter module 344 may include one or more timers and/or counters that track periods and counter values, respectively. Where timers (and periods) are discussed herein, counters (and counter values) may instead be used, and where counters (and counter values) are discussed herein, timers (and periods) may instead be used.

Figure 3:
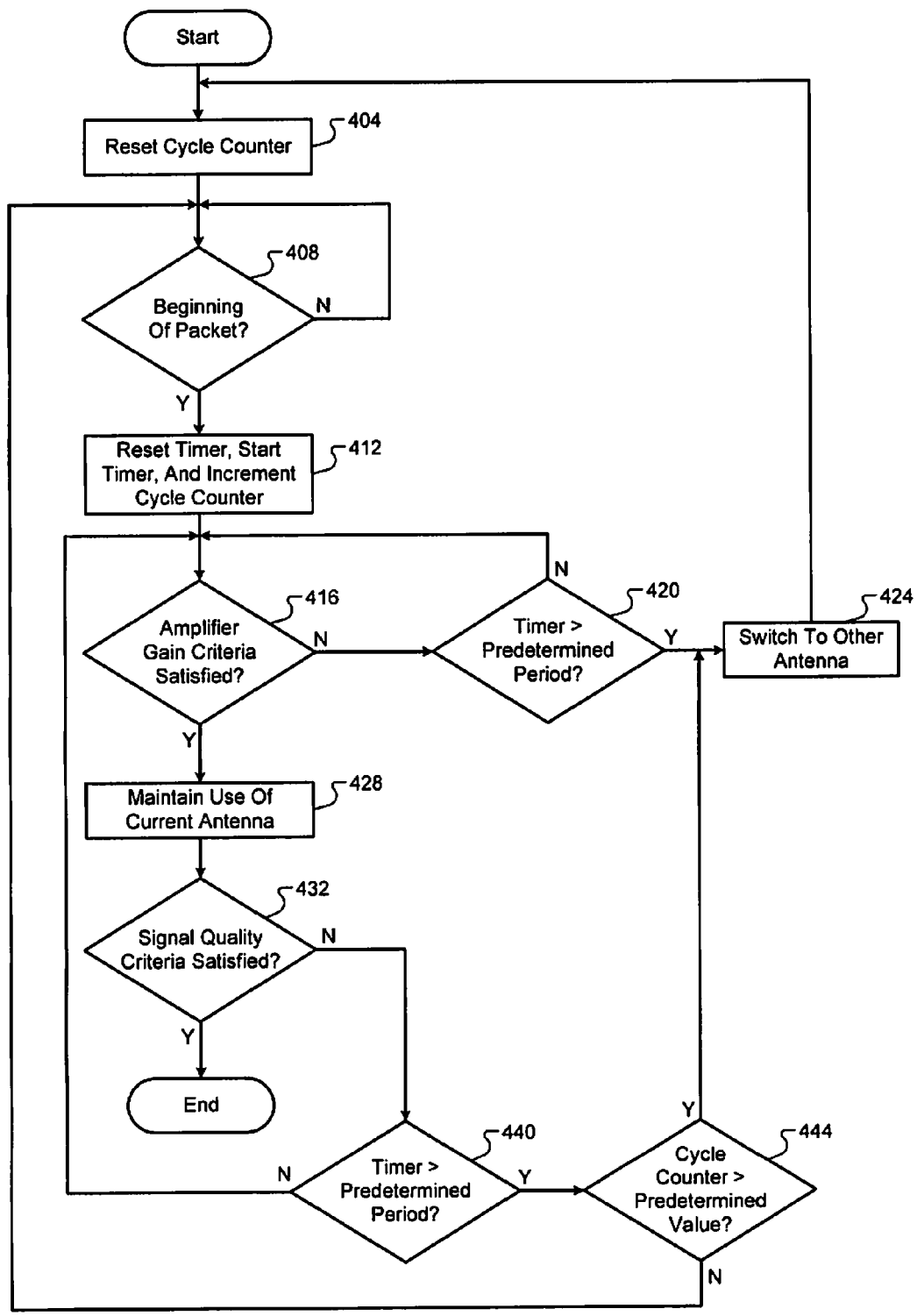
FIG. 3 is an example of a method for selectively switching between the two antennas according to one implementation of the present disclosure.

FIG. 3 is a flowchart depicting an example of a method for selectively switching between the first and second antennas 216 and 220 that may be performed by the receiver module 244. One of the first and second antennas 216 and 220 is already connected when control begins. For purposes of discussion only, FIG. 3 will be described in terms of the first antenna 216 being connected when control begins. The antenna selection module 340 may provide the control functions described in conjunction with the example of FIG. 3.

Control begins at 404 where the antenna selection module 340 resets a cycle counter value in the timer/counter module 344. At 408, the antenna selection module 340 determines whether the first antenna 216 has begun to receive a data packet. If 408 is true, control continues with 412. If 408 is false, control remains at 408. For example only, the antenna selection module 340 may continue with 412 when a predetermined signal is received, when a predetermined portion of the header of a data packet is received, or when one or more other predetermined indicators is/are detected.

At 412, the antenna selection module 340 resets a timer, starts the timer, and increments the cycle counter value. The timer therefore tracks a period that has passed since the beginning of the data packet. The antenna selection module 340 determines whether the gain of the LNA 308 and the gain of the VGA 324 satisfy one or more predetermined amplifier gain criteria at 416. If 416 is true, control may continue with 428, which is discussed further below. If 416 is false, control may transfer to 420. For example only, the predetermined amplifier gain criteria may be satisfied when the gain of the LNA 308 is approximately equal to a first predetermined gain value and the gain of the VGA 324 is less than a second predetermined gain value minus a third predetermined gain value. Additionally or alternatively, the predetermined amplifier gain criteria may be satisfied when the gain of the LNA 308 is less than the first predetermined gain value and the gain of the VGA 324 is less than the second predetermined value minus a fourth predetermined gain value. The gain of the LNA 308 may be approximately equal to the first predetermined gain value, for example, when a difference between the gain value of the LNA 308 and the first predetermined gain value is less than a fifth predetermined gain value.

While the above examples have been provided for determining whether the predetermined amplifier gain criteria are satisfied, the predetermined amplifier gain criteria may be set based on how the gains of the LNA 308 and the VGA 324 are controlled. Generally speaking, the antenna selection module 340 determines whether the predetermined amplifier gain criteria are satisfied based on a first comparison of the gain of the LNA 308 with a first predetermined gain value and a second comparison of the gain of the VGA 324 with a second predetermined gain value.

At 420, the antenna selection module 340 determines whether the period tracked by the timer is greater than a predetermined period. If 420 is false, control returns to 416, and the antenna selection module 340 continues to assess whether the predetermined amplifier gain criteria are satisfied. If 420 is true, the antenna selection module 340 commands the selecting module 304 to connect the second antenna 220 to the LNA 308 at 424, and control may return to 404. In this manner, the antenna selection module 340 commands the selecting module 304 to switch which one of the first and second antennas 216 and 220 is connected when the gain of the LNA 308 and the gain of the VGA 324 do not satisfy the predetermined amplifier gain criteria during the predetermined period. In some examples, the predetermined period is shorter than the length of the header of the data packet. In other words, the predetermined period may be set to end before the payload of the data packet begins. The length of the header (and other characteristics of the data packet) may be set in accordance with the wireless communication standard that is used.

At 428 (when the predetermined amplifier gain criteria are satisfied at 416), the antenna selection module 340 may maintain the connection of the first antenna 216. At 432, the antenna selection module 420 determines whether one or more predetermined signal quality criteria are satisfied. If 432 is true, control may end. If 432 is false, control may continue with 440. For example only, the predetermined signal quality criteria may be satisfied when the RSSI is greater than a predetermined value, when the code error rate of the received signal is less than a predetermined value, and/or when a correlation between the received signal and a predetermined signal is greater than a predetermined correlation value.

The antenna selection module 340 determines whether the period tracked by the timer is greater than the predetermined period at 440. If 440 is true, control continues with 444. If 440 is false, control returns to 416, and the antenna selection module 340 continues to assess whether the predetermined amplifier gain criteria are satisfied. At 444, the antenna selection module 340 determines whether the cycle counter value is greater than a predetermined value. If 444 is false, control may return to 408 to wait for a next packet. If 444 is true, the antenna selection module 340 commands the selecting module 304 to connect the second antenna 220 to the LNA 308 at 424, and control may return to 404. In this manner, the antenna selection module 340 commands the selecting module 304 to switch which one of the first and second antennas 216 and 220 is connected when the predetermined signal quality criteria is/are not satisfied during the predetermined period for the predetermined number of packets. The predetermined value is an integer greater than zero, and may be 1, 2, 3, 4, 5, 6, 7, 8, 9, 10, or another suitable value.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A device for wirelessly receiving a data packet, the device comprising:
   a first amplifier configured to provide a first variable gain;
   a selecting module configured to
      (i) connect a first antenna to the first amplifier when a selection signal is in a first state, and
      (ii) connect a second antenna to the first amplifier when the selection signal is in a second state;
   a second amplifier in communication with an output of the first amplifier, wherein the second amplifier is configured to provide a second variable gain;
   an automatic gain control (AGC) module configured to control each of the first variable gain and the second variable gain; and
   an antenna selection module configured to selectively change the selection signal in response to the first variable gain or the second variable gain after a preamble of the data packet and before a payload of the data packet, and, when the selection signal is set to the first state, to maintain the selection signal in the first state in response to determinations that:
the first variable gain is less than a first predetermined gain value; and
the second variable gain is less than a second predetermined gain value.

2. The device of claim 1, wherein the antenna selection module is configured to selectively change the selection signal to the first state or the second state in response to both of the first variable gain and the second variable gain.

3. The device of claim 1, wherein the antenna selection module is configured to selectively change the selection signal to the first state or the second state during a predetermined period before the payload of the data packet.

4. The device of claim 1, wherein the antenna selection module is configured to selectively change the selection signal in response to:
a first comparison of the first variable gain with the first predetermined gain value; or
a second comparison of the second variable gain with the second predetermined gain value.

5. The device of claim 1, wherein, when the selection signal is set to the first state, the antenna selection module is configured to maintain the selection signal in the first state in response to determinations that:
a difference between the first variable gain and a third predetermined value is less than a fourth predetermined gain value; and
the second variable gain is less than the second predetermined gain value.

6. The device of claim 1, wherein the antenna selection module is configured to change the selection signal from the first state to the second state in response to determinations that:
the first variable gain is less than the first predetermined gain value or the second variable gain is greater than the second predetermined gain value minus a third predetermined gain value; and
the first variable gain is not less than the first predetermined gain value or the second variable gain is less than the second predetermined gain value minus a fourth predetermined gain value.

7. The device of claim 1, wherein the first amplifier includes a variable gain amplifier and at least one other amplifier.

8. The device of claim 1, wherein the second amplifier includes a variable gain amplifier and at least one other amplifier.

9. The device of claim 1, wherein the first amplifier includes a low noise amplifier (LNA).

10. A method for wirelessly receiving a data packet, the method comprising:
connecting a first antenna to a first amplifier when a selection signal is in a first state,
wherein the first amplifier is configured to provide a first variable gain;
connecting a second antenna to a second amplifier when the selection signal is in a second state,
wherein the second amplifier is in communication with an output of the first amplifier, and
wherein the second amplifier is configured to provide a second variable gain;
controlling each of the first variable gain and the second variable gain;
selectively changing the selection signal in response to the first variable gain or the second variable gain after a preamble of the data packet and before a payload of the data packet; and when the selection signal is set to the first state, maintaining the selection signal in the first state in response to determinations that: the first variable gain is less than a first predetermined gain value; and the second variable gain is less than a second predetermined gain value.

11. The method of claim 10 further comprising selectively changing the selection signal to the first state or the second state in response to both of the first variable gain and the second variable gain.

12. The method of claim 10 further comprising selectively changing the selection signal to the first state or the second state during a predetermined period before the payload of the data packet.

13. The method of claim 10 further comprising selectively changing the selection signal in response to:
a first comparison of the first variable gain with the first predetermined gain value; or
a second comparison of the second variable gain with the second predetermined gain value.

14. The method of claim 10 further comprising, when the selection signal is set to the first state, maintaining the selection signal in the first state in response to determinations that:
a difference between the first variable gain and a third predetermined value is less than a fourth predetermined gain value; and
the second variable gain is less than the second predetermined gain value.

15. The method of claim 10, further comprising changing the selection signal from the first state to the second state in response to determinations that:
the first variable gain is less than the first predetermined gain value or the second variable gain is greater than the second predetermined gain value minus a third predetermined gain value; and
the first variable gain is not less than the first predetermined gain value or the second variable gain is less than the second predetermined gain value minus a fourth predetermined gain value.

16. The method of claim 10, wherein the first amplifier includes a variable gain amplifier and at least one other amplifier.

17. The method of claim 10, wherein the second amplifier includes a variable gain amplifier and at least one other amplifier.

18. The method of claim 10, wherein the first amplifier includes a low noise amplifier (LNA).

19. A device for wirelessly receiving a data packet, the device comprising:
a first amplifier configured to provide a first variable gain;
a selecting module configured to
(i) connect a first antenna to the first amplifier when a selection signal is in a first state, and
(ii) connect a second antenna to the first amplifier when the selection signal is in a second state;
a second amplifier in communication with an output of the first amplifier, wherein the second amplifier is configured to provide a second variable gain;
an automatic gain control (AGC) module configured to control each of the first variable gain and the second variable gain; and
an antenna selection module configured to selectively change the selection signal in response to the first variable gain or the second variable gain after a preamble of the data packet and before a payload of the data packet and, when the selection signal is set to the first state, the antenna selection module is configured to maintain the selection signal in the first state in response to determinations that:

a difference between the first variable gain and a first predetermined value is less than a second predetermined gain value; and the second variable gain is less than a third predetermined gain value.

20. A method for wirelessly receiving a data packet, the method comprising:

connecting a first antenna to a first amplifier when a selection signal is in a first state, wherein the first amplifier is configured to provide a first variable gain;

connecting a second antenna to a second amplifier when the selection signal is in a second state, wherein the second amplifier is in communication with an output of the first amplifier, and wherein the second amplifier is configured to provide a second variable gain;

controlling each of the first variable gain and the second variable gain;

selectively changing the selection signal in response to the first variable gain or the second variable gain after a preamble of the data packet and before a payload of the data packet; and when the selection signal is set to the first state, maintaining the selection signal in the first state in response to determinations that:

a difference between the first variable gain and a first predetermined value is less than a second predetermined gain value; and the second variable gain is less than a third predetermined gain value.

* * * * *